US012681932B2

(12) United States Patent
Pan et al.

(10) Patent No.: US 12,681,932 B2
(45) Date of Patent: Jul. 14, 2026

(54) OPTIMIZING QUERY PERFORMANCE IN A DATA VIRTUALIZATION SYSTEM

(71) Applicant: International Business Machines Corporation, Armonk, NY (US)

(72) Inventors: Ying Qi Pan, Beijing (CN); Jun Hui Liu, Xi'an (CN); Hai Jun Shen, Jin Nan (CN); Ya Qiong Liu, Beijing (CN); Chang Sheng Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/000,298

(22) Filed: Dec. 23, 2024

(65) Prior Publication Data

US 2026/0178582 A1      Jun. 25, 2026

(51) Int. Cl.
*G06F 16/24* (2019.01)
*G06F 16/2453* (2019.01)

(52) U.S. Cl.
CPC .............................. *G06F 16/24542* (2019.01)

(58) Field of Classification Search
None
See application file for complete search history.

(56) References Cited

U.S. PATENT DOCUMENTS

| | | | | |
|---|---|---|---|---|
| 9,201,924 | B1 * | 12/2015 | Fuller | ............... G06F 16/24542 |
| 11,243,961 | B2 | 2/2022 | Liu et al. | |
| 11,403,282 | B1 * | 8/2022 | Waas | ............... G06F 16/24534 |
| 2008/0133608 | A1 * | 6/2008 | Brown | ................ G06F 9/5083 |
| 2009/0063398 | A1 * | 3/2009 | Bhatia | ................ G06F 16/2462 |
| 2015/0112968 | A1 * | 4/2015 | Konik | ..................... H04L 67/10 |
| | | | | 707/718 |
| 2018/0121508 | A1 * | 5/2018 | Halstvedt | .......... G06F 16/24545 |
| 2020/0349161 | A1 * | 11/2020 | Siddiqui | ............... G06F 16/211 |
| 2021/0224675 | A1 * | 7/2021 | P | ........................... G06F 16/217 |
| 2023/0014697 | A1 | 1/2023 | Freedman et al. | |

(Continued)

FOREIGN PATENT DOCUMENTS

JP          2015106219 A  *  6/2015

OTHER PUBLICATIONS

Authors et. al., Disclosed Anonymous, A New Pushdown Checking Method Based on SQL Analysis in Data Virtualization, IPCOM000273486D, Dec. 12, 2023, 3 pages.

*Primary Examiner* — Augustine K. Obisesan
(74) *Attorney, Agent, or Firm* — Yee & Associates, P.C.

(57) ABSTRACT

A computer-implemented method for optimizing query performance in a data virtualization system. A processor set generates a number of query collections comprising query statements. The processor set determines network transfer times for data between the data virtualization system and a number of data sources connected with the data virtualization system, and an execution time for executing each query collection. The processor set identifies a number of factors associated with query performance for the data virtualization system. The processor set trains a machine learning model for estimating execution times for the queries based on the number of factors, the network transfer times, and the execution times. The processor set evaluates network conditions and performances of the number of data sources using the machine learning model. The processor set adjusts delegation of the queries to be executed remotely using the number of data sources based on the evaluation.

20 Claims, 5 Drawing Sheets

(56)                    References Cited

U.S. PATENT DOCUMENTS

2023/0069640 A1*    3/2023   Russell ............. G06F 16/24573
2023/0153302 A1     5/2023   Shen et al.
2023/0306026 A1     9/2023   Shen et al.

* cited by examiner

COMPUTING ENVIRONMENT
100

OPTIMIZING QUERY PERFORMANCE IN A DATA VIRTUALIZATION SYSTEM

BACKGROUND

The disclosure relates generally to optimizing query performance and more specifically to optimizing query performance in a data virtualization system.

A data virtualization system refers to a software platform that allows users and applications to access, retrieve, and manipulate data without the need to know the physical location and format for the data. The data virtualization system provides a unified, abstract view of multiple data sources as if the data are in a single place even though the data may reside across various databases, file systems, or cloud services. In other words, The data virtualization system provides a virtual layer that integrates disparate data sources into a single abstracted view instead of copying data into a centralized warehouse.

The data virtualization system provides real-time access of data to the users. In this case, since the data is not physically moved or duplicated, users can query data as it exists at the data source to ensure that the most up-to-date information is used. In addition, a data virtualization system also provides robust data governance and security controls. For example, organizations can implement centralized access policies, ensuring that sensitive data is protected regardless of where it is stored.

SUMMARY

According to one illustrative embodiment, a computer-implemented method for optimizing query performance in a data virtualization system is provided. A processor set generates a number of query collections comprising query statements with different query operators. The processor set determines network transfer times for data between the data virtualization system and a number of data sources connected with the data virtualization system, and an execution time for executing each query collection from the number of query collections. The data virtualization system delegates queries to the number of data sources for remote execution. The processor set identifies a number of factors associated with query performance for the data virtualization system. The processor set trains a machine learning model for estimating execution times for the queries using a training dataset comprising the number of factors, the network transfer times, and the execution times for executing the number of query collections. The processor set evaluates network conditions and performances of the number of data sources for executing queries for the data virtualization system using the machine learning model in real-time. The processor set adjusts delegation of the queries to be executed by the number of data sources for the data virtualization system based on the evaluation. According to other illustrative embodiments, a computer system, and a computer program product for optimizing query performance in a data virtualization system are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one or more storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 1:
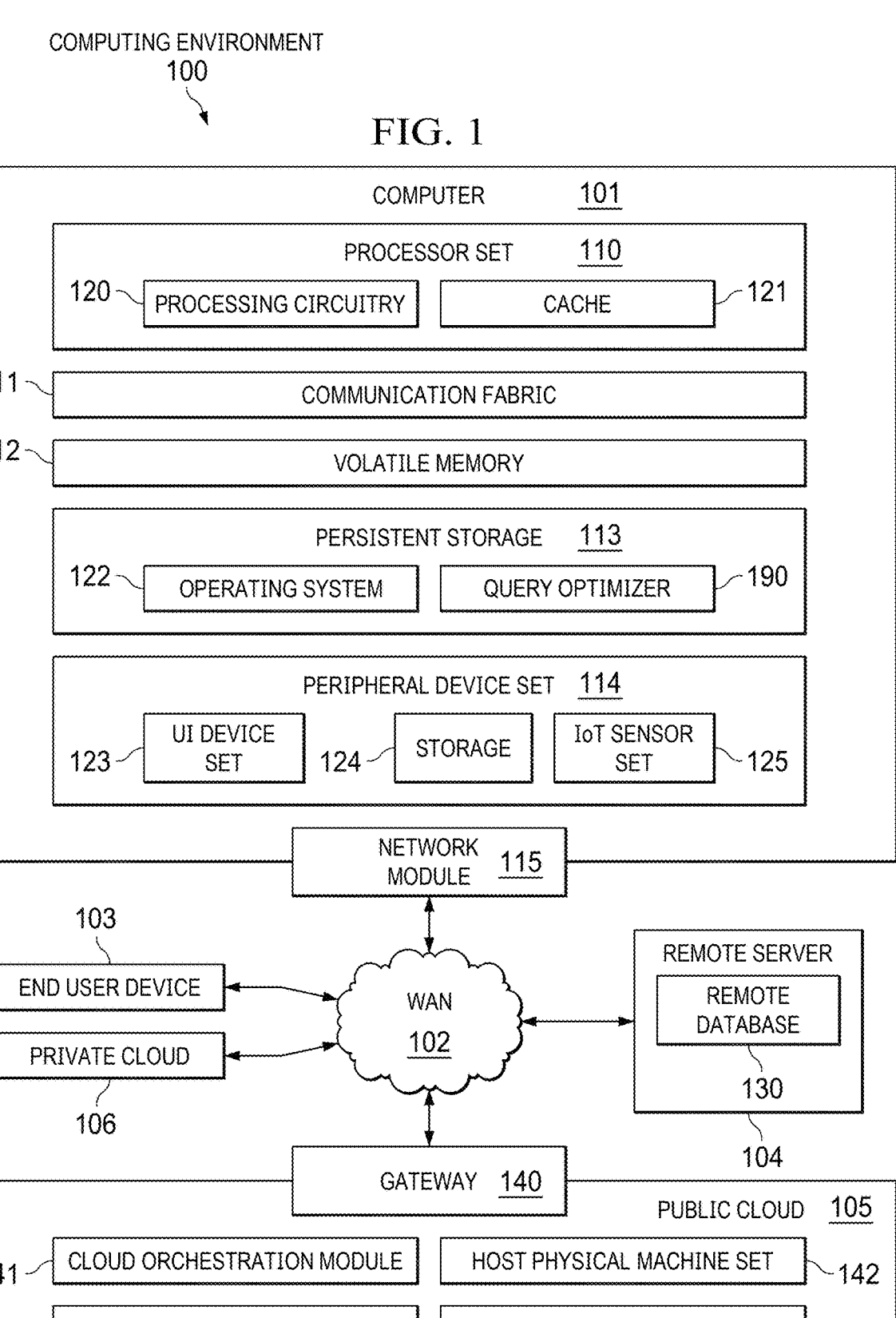
FIG. 1 is a pictorial representation of a computing environment in which illustrative embodiments may be implemented.

With reference now to the figures, and in particular with reference to FIG. 1, a block diagram of a computing environment is depicted in accordance with an illustrative embodiment. Computing environment 100 contains an example of an environment for the execution of at least some of the computer code involved in performing the inventive methods, such as query optimizer 190. In addition to query optimizer 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and query optimizer 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one or more computer processors of any type now known or to be developed in the future. Processing circuitry 120 may be distributed over multiple packages, for example, multiple coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions and associated data are accessed by processor set 110 to control and direct performance of the inventive methods. In computing environment 100, at least some of the instructions for performing the inventive methods may be stored in query optimizer 190 in persistent storage 113.

COMMUNICATION FABRIC 111 is the signal conduction path that allows the various components of computer

101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, volatile memory 112 is located in a single package and is internal to computer 101, but, alternatively or additionally, volatile memory 112 may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in query optimizer 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as a thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data application portability between the multiple constituent clouds. In this embodiment, public cloud 105 and private cloud 106 are both part of a larger hybrid cloud.

CLOUD COMPUTING SERVICES AND/OR MICRO-SERVICES: Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account one or more different considerations as described herein. For example, the illustrative embodiments recognize and take into account that one of the key features of a data virtualization system is its ability to federate queries across multiple data sources. In other words, a data virtualization system can use a single query to retrieve data from different sources and combine results to present them in a unified format.

The illustrative embodiments also recognize and take into account that a data virtualization system optimizes query performance by executing parts of the query directly on the source systems and only retrieving necessary data, thus reducing the need for massive data transfers.

The illustrative embodiments also recognize and take into account that query execution time is affected by multiple factors such as local database processing, remote data source processing, and network data transmission.

The illustrative embodiments also recognize and take into account that traditional approaches tend to delegate as many query operations as possible to a remote data source to reduce the amount of data transferred. However, this approach ignores the negative impact of fluctuations in performance for remote data sources on overall query performance. For example, when the performance of a remote data source is poor, delegating too many query operations to the remote data source will significantly increase the query execution time.

Thus, illustrative embodiments of the present invention provide a computer implemented method, computer system, and computer program product for optimizing query performance in a data virtualization system. In one illustrative example, a computer implemented method optimizes query performance in the data virtualization system. A processor set generates a number of query collections comprising query statements with different query operators. The processor set determines network transfer times for data between the data virtualization system and a number of data sources connected with the data virtualization system, and an execution time for executing each query collection from the number of query collections. The data virtualization system delegates queries to the number of data sources for remote execution. The processor set identifies a number of factors associated with query performance for the data virtualization system. The processor set trains a machine learning model for estimating execution times for the queries using a training dataset comprising the number of factors, the network transfer times, and the execution times for executing the number of query collections. The processor set evaluates network conditions and performances of the number of data sources for executing queries for the data virtualization system using the machine learning model in real-time. The processor set adjusts delegation of the queries to be executed by the number of data sources for the data virtualization system based on the evaluation.

Figure 2:
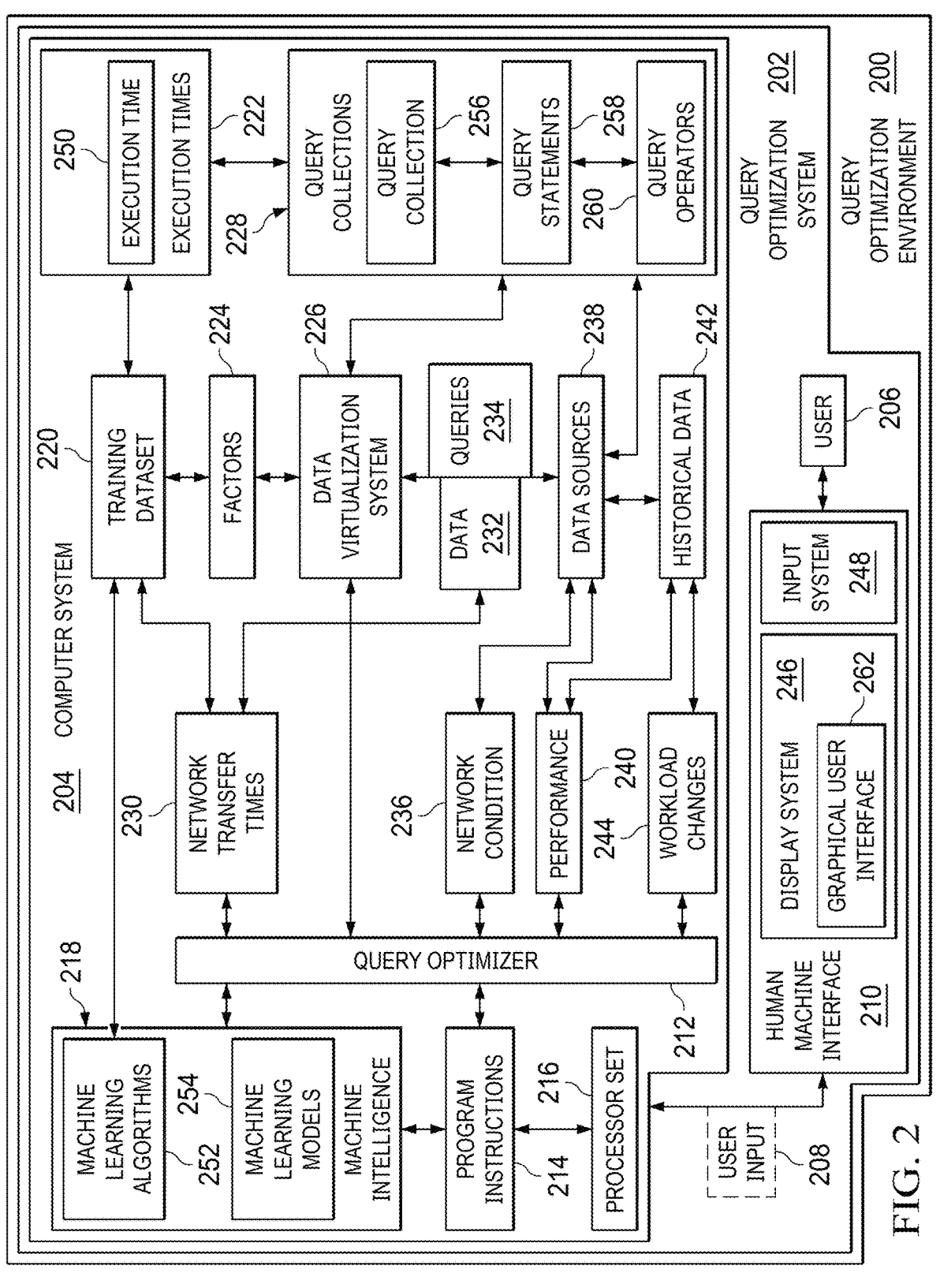
FIG. 2 is an illustration of a block diagram of a query optimization environment in accordance with an illustrative embodiment.

With reference now to FIG. 2, an illustration of a block diagram of a query optimization environment is depicted in accordance with an illustrative embodiment. In this illustrative example, query optimization environment 200 includes components that can be implemented in hardware such as the hardware shown in computing environment 100 in FIG. 1.

In this illustrative example, query optimization system 202 in query optimization environment 200 uses query optimizer 212 to adjust delegation of queries 234 from data virtualization system 226 to data sources 238. In this illustrative example, query optimization system 202 includes computer system 204 which includes query optimizer 212. Query optimizer 212 is located in computer system 204. Query optimizer 212 may be implemented using query optimizer 190 in FIG. 1.

Query optimizer 212 can be implemented in software, hardware, firmware, or a combination thereof. When software is used, the operations performed by query optimizer 212 can be implemented in program instructions configured to run on hardware, such as a processor unit. When firmware is used, the operations performed by query optimizer 212 can be implemented in program instructions and data and stored in persistent memory to run on a processor unit. When hardware is employed, the hardware can include circuits that operate to perform the operations in query optimizer 212.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C," may include item A, item A and item B, or item B. This example also may include item A, item B, and item C, or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes processor set 216 that is capable of executing program instructions 214 implementing processes in the illustrative examples. In other words, program instructions 214 are computer-readable program instructions.

As used herein, a processor unit in processor set 216 is a hardware device and is comprised of hardware circuits such as those on an integrated circuit that respond to and process instructions and program code that operate a computer. A processor unit can be implemented using processor set 110 in FIG. 1. When processor set 216 executes program instructions 214 for a process, processor set 216 can be one or more processor units that are in the same computer or in different computers. In other words, the process can be distributed between processor set 216 on the same or different computers in computer system 204.

Further, processor set 216 can be of the same type or different types of processor units. For example, processor set 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, computer system 204 includes queries 234. As depicted, data virtualization system 226 delegate queries 234 to data sources 238 for remote execution. In this illustrative example, data virtualization system 226 is a software platform that provides a unified, virtual view of data from data sources such as data sources 238. Data virtualization system 226 abstracts away the complexity and heterogeneity of the underlying data sources for allowing users and applications to access and manipulate data seamlessly, as if it were stored in a single, unified database.

In addition, data virtualization system 226 does not physically store or replicate the data from the data sources but instead integrates and federates access to the data sources through a layer of abstraction. This layer of abstraction translates and optimizes queries such as queries 234 and dynamically delegating parts of query execution to the most appropriate data source based on performance and capabilities.

In this illustrative example, data sources 238 are systems or repositories where data is stored and can be accessed or queried by the virtualization layer of data virtualization system 226. For example, data sources 238 can be an application, a file system, a streaming data source, a remote database or an external database such as relational database, NoSQL database, or any system or repository that stores data.

As depicted, computer system 204 includes a number of query collections 228. In this illustrative example, the number of query collections 228 is generated automatically and contain various query operations to ensure that the number of query collections 228 covers a wide range of possible query scenarios. For example, query collection 256 from the number of query collections 228 can have a number of query statements 258 that are associated with different query operators from query operators 260. Query statements 258 are commands used in database query languages to manipulate and interact with data in databases. Query statements 258 defines the operations that can be performed on the data stored in databases, such as retrieving, updating, inserting, or deleting data. In addition, query operators 260 are symbols or keywords used in database query languages to specify actions on data and control how data is filtered, retrieved, or manipulated within query.

In this illustrative example, query optimizer 212 determines execution times 222 for query collections in query collections 228. In this illustrative example, an execution time is determined for each query collection in query collections 228. For example, query optimizer 212 can determine execution time 250 for query collection 256.

It should be understood that not all query operators in query operators 260 are supported by data sources in data sources 238. In this illustrative example, query statements with unsupported query operators are executed locally on data virtualization system 226 for determining execution times while query statements with supported query operators are executed remotely on data sources 238 for determining execution times.

Query optimizer 212 can also determine network transfer times 230 by simulating transfer of data 232 between data virtualization system 226 and data sources 238. In this illustrative example, data 232 includes data with different sizes and data types. In other words, network transfer times 230 includes data transfer times between data virtualization system 226 and data sources 238 for data of various types and sizes.

In this illustrative example, query optimizer 212 further determines a number of factors 224 associated with query performance for data virtualization system 226. In this illustrative example, query performance for data virtualization system 226 encompasses a wide range of considerations that contribute to the overall efficiency and responsiveness of data virtualization system 226. For example, the query performance for data virtualization system 226 can include execution time, resource utilization, throughput, latency, and scalability. In this example, execution time is the time taken to complete a query, which start from initiation to result retrieval. This includes the time spent in both local and remote databases such as data sources 238, as well as the data transmission time between them. Resource utilization is the extent to which the system's hardware resources (e.g., CPU, memory, disk I/O, etc.) are utilized during query execution. Throughput is the number of queries that can be processed by data virtualization system 226 within a given time frame. In this illustrative example, high throughput indicates that the system can handle a large volume of queries efficiently. Scalability is the ability of data virtualization system 226 to handle an increasing workload without significantly degrading performance.

In this illustrative example, the number of factors 224 can include operator type, dataset size, data type, performance metrics such as CPU usage, memory usage, response time, network bandwidth, and latency for data sources 238, or any factor that is associated with query execution time and resources utilization.

In this illustrative example, query optimizer 212 can perform correlation analysis for the number of factors 224 to determine features that are most relevant to query performance. In addition, query optimizer 212 can also uses techniques such as Principal component analysis (PCA), linear discriminant analysis (LDA) and other methods are used to remove redundant features and reduce model complexity.

Query optimizer 212 generates training dataset 220 for training machine learning models 254 in machine intelligence 218. In this illustrative example, training dataset 220 can include network transfer times 230, execution times 222, and factors 224.

In this illustrative example, training dataset 220 can be preprocessed before further processing. For example, query optimizer 212 can ensure the data format for data in training dataset 220 is consistent and exclude outliers in training dataset 220. In addition, training dataset 220 can also normalize data in training dataset 220 into a standard format or encoding data in training dataset 220 using techniques such as one-hot encoding or label encoding such as that data in training dataset 220 is in a format that can be handled by machine intelligence 218.

As depicted, computer system 204 includes machine intelligence 218. Machine intelligence 218 can include machine learning models 254 and machine learning algorithms 252. Machine learning models 254 are a branch of artificial intelligence (AI) that enable computer system 204 to detect patterns and improve performance without direct programming commands. Rather than relying on direct input commands to complete a task, machine learning models 254 relies on input data. The data is fed into the machine, one of machine learning algorithms 252 is selected, parameters for the data are configured, and the machine is instructed to find patterns in the input data through optimization algorithms. The data model formed from analyzing the data is then used to predict future values.

Machine intelligence 218 is continuously refined over time through trial and error. Equivalence of assets or products can be effectively performed by supervised machine learning so that products or assets that do not match descriptively can nevertheless be matched. Over time, the data model from machine learning can provide a greater degree of flexibility in matching machine intelligence 218.

Machine intelligence 218 can be implemented using one or more systems such as an artificial intelligence system, a neural network, a generative neural network, a Bayesian network, an expert system, a fuzzy logic system, a genetic algorithm, or other suitable types of systems. Machine learning models 254 and machine learning algorithms 252 may make computer system 204 a special purpose computer for optimizing query delegations between data virtualization system 226 and data sources 238.

Machine learning models 254 involves using machine learning algorithms 252 to build computation models based on samples of data. The samples of data used for training are referred to as training data or training datasets, such as training dataset 220. Machine intelligence 218 can make predictions without being explicitly programmed to make these predictions. Machine intelligence 218 can be used for training and retraining computation models for a number of different types of applications. These applications include, for example, medicine, financial services, healthcare, speech recognition, computer vision, or other types of applications.

In this illustrative example, training of machine learning models 254 can further include dividing preprocessed data into training datasets, validation datasets, and test datasets. In addition, query optimizer 212 can use techniques such as cross-validation to optimize parameters for machine learning models for better accuracy and efficiency.

In this illustrative example, machine learning algorithms 252 can include supervised machine learning algorithms and unsupervised machine learning algorithms. Supervised machine learning can train machine learning models using data containing both the inputs and desired outputs.

Examples of machine learning algorithms include regression algorithm, XGBoost, K-means clustering, and ensemble learning such as random forest.

In this illustrative example, query optimizer 212 can evaluate machine learning models 254 by determining performance indicators such as mean square error (MSE), root mean square error (RMSE), and mean absolute error (MAE) for machine learning models 254.

In this illustrative example, machine learning models 254 can be retrained or updated using new data or outputs generated by machine learning models 254 such that parameters in machine learning algorithm selected for machine learning models 254 can be adjusted to improve accuracy and efficiency of machine learning models 254.

After machine learning models 254 are trained, query optimizer 212 can evaluate data sources 238 to determine network condition 236 and performance 240 for data sources 238 in real-time using machine learning models 254 from machine intelligence 218. As depicted, network condition 236 refers to various factors that describe the quality, performance, and reliability of a network connection between data virtualization system 226 and data sources 238. For example, network condition 236 can include latency, bandwidth, packet loss, network congestion, or connection stability for the network connection between data virtualization system 226 and data sources 238. On the other hand, performance 240 is a measure of overall efficiency and responsiveness of data sources 238 for handling queries 234 that are delegated by data virtualization system 226 for remote execution. In this illustrative example, network condition 236 and performance 240 are periodically reevaluated to reflect the most up to date condition and performance for data sources 238.

In this illustrative example, query optimizer 212 can dynamically adjust delegation of queries 234 between data virtualization system 226 and data sources 238 based on performance 240 and network condition 236. For example, data virtualization system 226 can delegate more queries to data sources 238 for remote execution when performance 240 and network condition 236 indicate that efficiency for executing queries exceeds a threshold. On the other hand, data virtualization system 226 can delegate less queries to data sources 238 for remote execution when performance 240 and network condition 236 indicate that efficiency for executing queries does not meet the threshold.

In this illustrative example, the threshold can be a user-defined threshold, or automatically determined by query optimizer 212 based on execution time for handling queries 234 locally on data virtualization system 226 and execution time for handling queries 234 remotely on data sources 238, which can be predicted in real-time using machine learning models 254.

In addition, query optimizer 212 can also monitor query execution on data virtualization system 226 and query execution on data sources 238 to generate historical data 242 for query performance for data virtualization system 226 over time. Query optimizer 212 can forecast workload of data virtualization system 226 and data sources 238 to determine workload changes 244 based on historical data 242 using machine learning models 254. In other words, query optimizer 212 can forecast future workload changes for data virtualization system 226 and data sources 238 such that adjustment for delegation of queries 234 can be planned before actual workload changes. As a result, query optimizer 212 can dynamically adjust delegation of queries 234 between data virtualization system 226 and data sources 238 based on workload changes 244. In this illustrative example, query optimizer 212 can also implement reasonable concurrency control mechanisms, such as throttling and queuing, to manage resource contention between multiple query requests.

Further, query optimizer 212 can perform performance test on data virtualization system 226 in different application scenarios such as high concurrency, large data volume, and complex queries. In this illustrative example, query optimizer 212 can record and analyze performance indicators based on results from the performance test. In an alternative illustrative example, query optimizer 212 can perform a reliability test to verify stability and reliability of data virtualization system 226 through long-term operation and simulated failure scenarios. In this illustrative example, the reliability test aims ensure that data virtualization system 226 can quickly respond and resume normal operation in the event of an abnormal situation such as remote data source failure or network outage.

In this illustrative example, user 206 can interact with computer system 204 through user inputs to computer system 204. In this illustrative example, user input 208 can be generated by user 206 using human machine interface (HMI) 210. As depicted, human machine interface 210 includes display system 246 and input system 248. Display system 246 is a physical hardware system and includes one or more display devices on which graphical user interface 262 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

In this example, user 206 is a person that can interact with graphical user interface 262 through user input 208 generated by input system 248. Input system 248 is a physical hardware system and can be selected from at least one of a mouse, a keyboard, a touch pad, a trackball, a touchscreen, a stylus, a motion sensing input device, a gesture detection device, a data glove, a cyber glove, a haptic feedback device, or some other suitable type of input device. In this illustrative example, user 206 can utilize graphical user interface 262 to view query collections 228, network condition 236, performance 240, and workload changes 244. In addition, user 206 can utilize human machine interface 210 to manage the training of machine learning models 254 or adjustment for delegation of queries between data virtualization system 226 and data sources 238. In addition, user 206 can visualize the predictive power of machine learning models 254 by plotting a plot comparing the predicted value with the actual value through graphical user interface 262.

In one illustrative example, one or more solutions are present that overcome a problem with optimizing query executions. As a result, one or more technical solutions may provide an ability to increase the efficiency for query delegation in computer system 204.

In the illustrative example, computer system 204 can be configured to perform at least one of the steps, operations, or actions described in the different illustrative examples using software, hardware, firmware, or a combination thereof. As a result, computer system 204 operates as a special purpose computer system in which query optimizer 212 in computer system 204 enables efficient delegation of queries 234 between data virtualization system 226 and data sources 238. In particular, query optimizer 212 transforms computer system 204 into a special purpose computer system as compared to currently available general computer systems that do not have a query optimizer 212.

In the illustrative example, the use of query optimizer 212 in computer system 204 integrates processes into a practical application for optimizing query performance. In other words, query optimizer 212 in computer system 204 is directed to a practical application of processes integrated into query optimizer 212 in computer system 204 that optimizes query performance. In this illustrative example, query optimizer 212 can efficiently help computer system 204 to increase computer performance and resources allocation by dynamically adjusting query delegations.

The illustration of query optimization environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
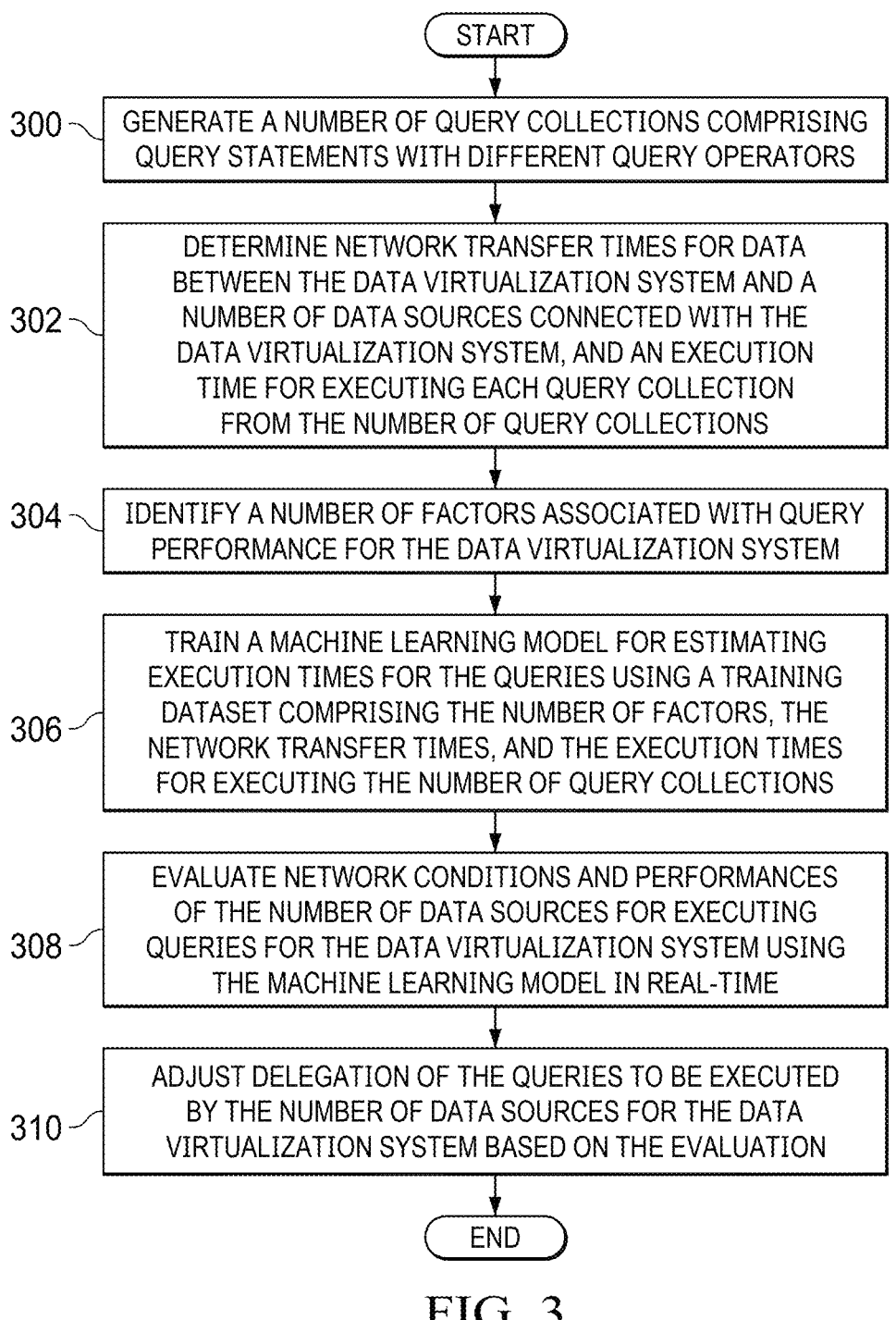
FIG. 3 is a flowchart of a process for optimizing query performance in accordance with an illustrative embodiment.

With reference now to FIG. 3, a flowchart illustrating a process for optimizing query performance is shown in accordance with an illustrative embodiment. The process in FIG. 3 can be implemented in hardware, software, or both. When implemented in software, the process can take the form of program instructions that are run by one of more processor units located in one or more hardware devices in one or more computer systems. For example, the process can be implemented in query optimizer 212 in computer system 204 in FIG. 2.

The process begins by generating a number of query collections comprising query statements with different query operators (step 300). The process determines network transfer times for data between the data virtualization system and a number of data sources connected with the data virtualization system, and an execution time for executing each query collection from the number of query collections (step 302). In step 302, the data virtualization system delegates queries to the number of data sources for remote execution.

The process identifies a number of factors associated with query performance for the data virtualization system (step 304). The process trains a machine learning model for estimating execution times for the queries using a training dataset comprising the number of factors, the network transfer times, and the execution times for executing the number of query collections (step 306). The process evaluates network conditions and performances of the number of data sources for executing queries for the data virtualization system using the machine learning model in real-time (step 308).

The process adjusts delegation of the queries to be executed by the number of data sources for the data virtualization system based on the evaluation (step 310). The process terminates thereafter.

Figure 4:
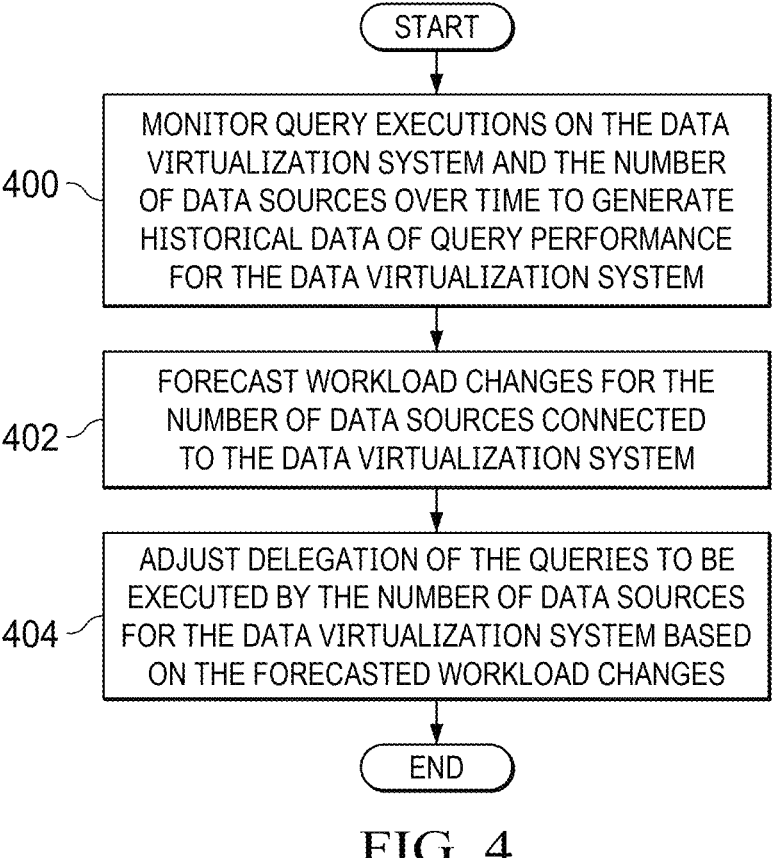
FIG. 4 is a flowchart of a process for adjusting delegation of queries in accordance with an illustrative embodiment.

Turning next to FIG. 4, a flowchart of a process for adjusting delegation of queries is depicted in accordance with an illustrative embodiment. The process in this figure is an example of an additional step that can be performed with the steps in FIG. 3.

The process begins by monitoring query executions on the data virtualization system and the number of data sources over time to generate historical data of query performance for the data virtualization system (step 400). The process forecasts workload changes for the number of data sources connected to the data virtualization system based on the historical data (step 402). The process adjusts delegation of the queries to be executed by the number of data sources for the data virtualization system based on the forecasted workload changes (step 404). The process terminates thereafter.

Figure 5:
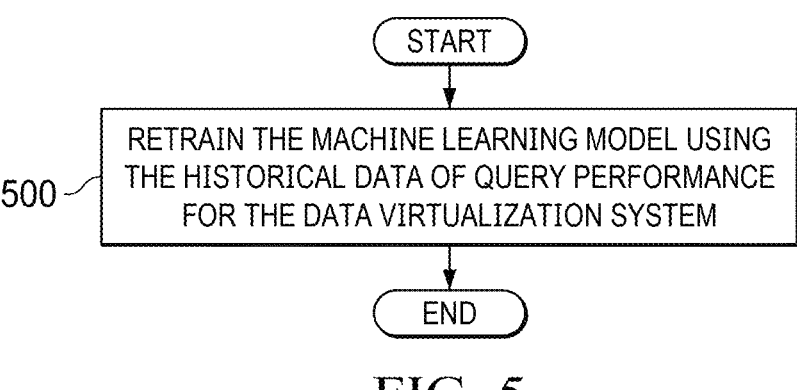
FIG. 5 is a flowchart of a process for retraining the machine learning model in accordance with an illustrative embodiment.

Turning next to FIG. 5, a flowchart of a process for retraining the machine learning model is depicted in accordance with an illustrative embodiment. The process in this figure is an example of an additional step that can be performed with the steps in FIG. 4.

The process begins by retraining the machine learning model using the historical data of query performance for the data virtualization system (step 500). The process terminates thereafter.

Figure 6:
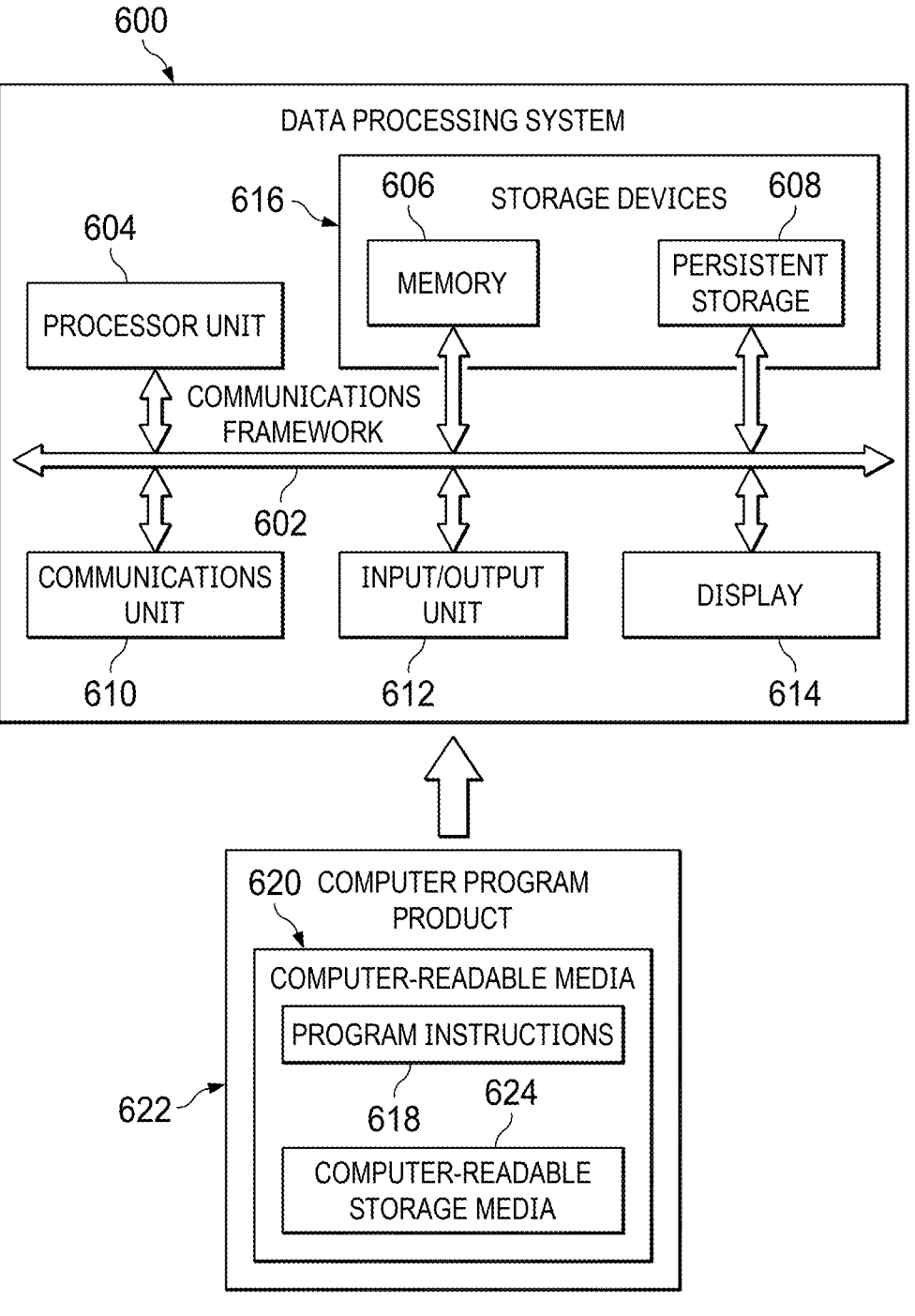
FIG. 6 is a block diagram of a data processing system in accordance with an illustrative embodiment.

Turning now to FIG. 6, a block diagram of a data processing system is depicted in accordance with an illustrative embodiment. Data processing system 600 can be used to implement computers and computing devices in computing environment 100 in FIG. 1. Data processing system 600 can also be used to implement computer system 204 in FIG. 2. In this illustrative example, data processing system 600 includes communications framework 602, which provides communications between processor unit 604, memory 606, persistent storage 608, communications unit 610, input/output (I/O) unit 612, and display 614. In this example, communications framework 602 takes the form of a bus system.

Processor unit 604 serves to execute instructions for software that can be loaded into memory 606. Processor unit 604 includes one or more processors. For example, processor unit 604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 604 can be implemented using one or more heterogeneous processor systems in which a main processor is present with secondary processors on a single chip. As another illustrative example, processor unit 604 can be a symmetric multiprocessor system containing multiple processors of the same type on a single chip.

Memory 606 and persistent storage 608 are examples of storage devices 616. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 616 may also be referred to as computer-readable storage devices in these illustrative examples. Memory 606, in these examples, can be, for example, a random-access memory or any other suitable volatile or non-volatile storage device. Persistent storage 608 may take various forms, depending on the particular implementation.

For example, persistent storage 608 may contain one or more components or devices. For example, persistent storage 608 can be a hard drive, a solid-state drive (SSD), a flash memory, a rewritable optical disk, a rewritable magnetic tape, or some combination of the above. The media used by persistent storage 608 also can be removable. For example, a removable hard drive can be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that can be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs can be located in storage devices 616, which are in communication with processor unit 604 through communications framework 602. The processes of the different embodiments can be performed by processor unit 604 using computer-implemented instructions, which may be located in a memory, such as memory 606.

These instructions are referred to as program instructions, computer usable program instructions, or computer-readable program instructions that can be read and executed by a processor in processor unit 604. The program instructions in the different embodiments can be embodied on different physical or computer-readable storage media, such as memory 606 or persistent storage 608.

Program instructions 618 are located in a functional form on computer-readable media 620 that is selectively removable and can be loaded onto or transferred to data processing system 600 for execution by processor unit 604. Program instructions 618 and computer-readable media 620 form computer program product 622 in these illustrative examples. In the illustrative example, computer-readable media 620 is computer-readable storage media 624.

Computer-readable storage media 624 is a physical or tangible storage device used to store program instructions 618 rather than a medium that propagates or transmits program instructions 618. Computer-readable storage media 624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 618 can be transferred to data processing system 600 using a computer-readable signal media. The computer-readable signal media are signals and can be, for example, a propagated data signal containing program instructions 618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 620" can be singular or plural. For example, program instructions 618 can be located in computer-readable media 620 in the form of a single storage device or system. In another example, program instructions 618 can be located in computer-readable media 620 that is distributed in multiple data processing systems. In other words, some instructions in program instructions 618 can be located in one data processing system while other instructions in program instructions 618 can be located in one data processing system. For example, a portion of program instructions 618 can be located in computer-readable media 620 in a server computer while another portion of program instructions 618 can be located in computer-readable media 620 located in a set of client computers.

The different components illustrated for data processing system 600 are not meant to provide architectural limitations to the manner in which different embodiments can be implemented. In some illustrative examples, one or more of the components may be incorporated in or otherwise form a portion of another component. For example, memory 606, or portions thereof, may be incorporated in processor unit 604 in some illustrative examples. The different illustrative embodiments can be implemented in a data processing system including components in addition to or in place of those illustrated for data processing system 600. Other components shown in FIG. 6 can be varied from the illustrative examples shown. The different embodiments can be implemented using any hardware device or system capable of running program instructions 618.

Thus, illustrative embodiments of the present disclosure provide a computer-implemented method, computer system, and computer program product for managing containers. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for optimizing query performance in a data virtualization system, the computer implemented method comprising:
    generating, by a processor set, a number of query collections comprising query statements with different query operators;
    determining, by the processor set, network transfer times for data between the data virtualization system and a number of data sources connected with the data virtualization system, and an execution time for executing each query collection from the number of query collections, wherein the data virtualization system delegates queries to the number of data sources for remote execution, and wherein query statements with unsupported query operators are executed locally on the data virtualization system for determining execution times while query statements with supported query operators are executed remotely on the number of data sources for determining execution times;
    identifying, by the processor set, a number of factors associated with query performance for the data virtualization system;
    training, by the processor set, a machine learning model for estimating execution times for the queries using a training dataset comprising the number of factors, the network transfer times, and the execution times for executing the number of query collections;
    evaluating, by the processor set using the machine learning model in real-time, network conditions and performances of the number of data sources for executing queries for the data virtualization system; and
    adjusting, by the processor set, delegation of the queries to be executed by the number of data sources for the data virtualization system based on the evaluation.

2. The computer implemented method of claim 1, further comprising:
    monitoring, by the processor set, query executions on the data virtualization system and the number of data sources over time to generate historical data of query performance for the data virtualization system;
    forecasting, by the processor set, workload changes for the number of data sources connected to the data virtualization system based on the historical data; and
    adjusting, by the processor set, delegation of the queries to be executed by the number of data sources for the data virtualization system based on the forecasted workload changes.

3. The computer implemented method of claim 2, further comprising:
    retraining, by the processor set, the machine learning model using the historical data of query performance for the data virtualization system.

4. The computer implemented method of claim 1, wherein the network transfer times for data between the data virtualization system and the number of data sources connected with the data virtualization system are determined by simulating transferring datasets of different sizes and types between the data virtualization system and the number of data sources connected with the data virtualization system.

5. The computer implemented method of claim 1, wherein the number of factors comprise at least one of operation type, dataset size, data type, available resources in the number of data sources, network bandwidth, and network latency.

6. The computer implemented method of claim 1, wherein the number of query collections comprise query statements with operators unsupported by the number of data sources.

7. The computer implemented method of claim 1, wherein the machine learning model uses a regression algorithm for estimating execution time of the queries.

8. A computer system comprising:
    a processor set;
    a set of one or more computer-readable storage media; and program instructions stored on the set of one or more
storage media to cause the processor set to perform
operations comprising:
generating a number of query collections comprising
query statements with different query operators;
determining network transfer times for data between a
data virtualization system and a number of data
sources connected with the data virtualization sys-
tem, and an execution time for executing each query
collection from the number of query collections,
wherein the data virtualization system delegates que-
ries to the number of data sources for remote execu-
tion, and wherein query statements with unsupported
query operators are executed locally on the data
virtualization system for determining execution
times while query statements with supported query
operators are executed remotely on the number of
data sources for determining execution times;
identifying a number of factors associated with query
performance for the data virtualization system;
training a machine learning model for estimating
execution times for the queries using a training
dataset comprising the number of factors, the net-
work transfer times, and the execution times for
executing the number of query collections;
evaluating network conditions and performances of the
number of data sources for executing queries for the
data virtualization system using the machine learn-
ing model in real-time; and
adjusting delegation of the queries to be executed by
the number of data sources for the data virtualization
system based on the evaluation.

9. The computer system of claim 8, wherein the opera-
tions further comprise:
monitoring query executions on the data virtualization
system and the number of data sources over time to
generate historical data of query performance for the
data virtualization system;
forecasting workload changes for the number of data
sources connected to the data virtualization system
based on the historical data; and
adjusting delegation of the queries to be executed by the
number of data sources for the data virtualization
system based on the forecasted workload changes.

10. The computer system of claim 9, wherein the opera-
tions further comprise:
retraining the machine learning model using the historical
data of query performance for the data virtualization
system.

11. The computer system of claim 8, wherein the network
transfer times for data between the data virtualization system
and the number of data sources connected with the data
virtualization system are determined by simulating transfer-
ring datasets of different sizes and types between the data
virtualization system and the number of data sources con-
nected with the data virtualization system.

12. The computer system of claim 8, wherein the number
of factors comprise at least one of operation type, dataset
size, data type, available resources in the number of data
sources, network bandwidth, and network latency.

13. The computer system of claim 8, wherein the number
of query collections comprise query statements with opera-
tors unsupported by the number of data sources.

14. The computer system of claim 8, wherein the machine
learning model uses a regression algorithm for estimating
execution time of the queries.

15. A computer program product for optimizing query
performance in a data virtualization system, the computer
program product comprising:
a set of one or more computer-readable storage media;
program instructions stored in the set of one or more
storage media to perform operations comprising:
generating, by a processor set, a number of query
collections comprising query statements with differ-
ent query operators;
determining, by the processor set, network transfer
times for data between the data virtualization system
and a number of data sources connected with the data
virtualization system, and an execution time for
executing each query collection from the number of
query collections, wherein the data virtualization
system delegates queries to the number of data
sources for remote execution, and wherein query
statements with unsupported query operators are
executed locally on the data virtualization system for
determining execution times while query statements
with supported query operators are executed
remotely on the number of data sources for deter-
mining execution times;
identifying, by the processor set, a number of factors
associated with query performance for the data vir-
tualization system;
training, by the processor set, a machine learning model
for estimating execution times for the queries using
a training dataset comprising the number of factors,
the network transfer times, and the execution times
for executing the number of query collections;
evaluating, by the processor set using the machine
learning model in real-time, network conditions and
performances of the number of data sources for
executing queries for the data virtualization system;
and
adjusting, by the processor set, delegation of the que-
ries to be executed by the number of data sources for
the data virtualization system based on the evalua-
tion.

16. The computer program product of claim 15, wherein
the operations further comprise:
monitoring, by the processor set, query executions on the
data virtualization system and the number of data
sources over time to generate historical data of query
performance for the data virtualization system;
forecasting, by the processor set, workload changes for
the number of data sources connected to the data
virtualization system based on the historical data; and
adjusting, by the processor set, delegation of the queries
to be executed by the number of data sources for the
data virtualization system based on the forecasted
workload changes.

17. The computer program product of claim 16, wherein
the operations further comprise:
retraining, by the processor set, the machine learning
model using the historical data of query performance
for the data virtualization system.

18. The computer program product of claim 15, wherein
the network transfer times for data between the data virtu-
alization system and the number of data sources connected
with the data virtualization system are determined by simu-
lating transferring datasets of different sizes and types
between the data virtualization system and the number of
data sources connected with the data virtualization system.

19. The computer program product of claim 15, wherein
the number of factors comprise at least one of operation type, dataset size, data type, available resources in the number of data sources, network bandwidth, and network latency.

20. The computer program product of claim 15, wherein the number of query collections comprise query statements with operators unsupported by the number of data sources.

* * * * *